US009728177B2

(12) United States Patent
Mekid et al.

(10) Patent No.: US 9,728,177 B2
(45) Date of Patent: Aug. 8, 2017

(54) ACOUSTIC RESONATOR ASSEMBLY HAVING VARIABLE DEGREES OF FREEDOM

(71) Applicants: Samir N. Mekid, Dhahran (SA); Muhammad A. Hawwa, Dhahran (SA); Zheji Liu, Olean, NY (US)

(72) Inventors: Samir N. Mekid, Dhahran (SA); Muhammad A. Hawwa, Dhahran (SA); Zheji Liu, Olean, NY (US)

(73) Assignees: Dresser-Rand Company, Olean, NY (US); KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 3 days.

(21) Appl. No.: 14/615,052

(22) Filed: Feb. 5, 2015

(65) Prior Publication Data

US 2016/0230778 A1 Aug. 11, 2016

(51) Int. Cl.

| | |
|---|---|
| ***F04D 29/06*** | (2006.01) |
| ***G10K 11/172*** | (2006.01) |
| ***F16L 55/033*** | (2006.01) |
| ***G10K 11/00*** | (2006.01) |
| ***F04D 29/44*** | (2006.01) |
| ***F04D 29/66*** | (2006.01) |
| *F04D 29/00* | (2006.01) |

(Continued)

(52) U.S. Cl.
CPC .......... *G10K 11/002* (2013.01); *F04D 29/441* (2013.01); *F04D 29/665* (2013.01); *G10K 11/172* (2013.01); *F05D 2250/51* (2013.01); *F05D 2250/52* (2013.01)

(58) Field of Classification Search
CPC ...... F04D 29/665; F04D 29/663; F16K 47/02; F16K 47/026; F16K 47/045; F16K 47/08; F01N 1/026; F01N 1/082; F01N 1/161; F01N 1/18; G10K 11/161; G10K 11/162; G10K 11/172; G10K 11/1788; F16L 55/02; F16L 55/02709; F16L 55/033; F03B 11/04
USPC ....... 181/292, 293, 219, 210, 267, 277, 278, 181/271, 241, 224, 250
See application file for complete search history.

(56) References Cited

U.S. PATENT DOCUMENTS 1,955,479 A * 4/1934 Weinberger ............ F04D 25/14 181/224
2,320,668 A * 6/1943 Smith ...................... F01N 1/18 181/277

(Continued)

*Primary Examiner* — Edgardo San Martin

(57) ABSTRACT

An acoustic resonator assembly may include a first acoustic liner and a second acoustic liner. The first acoustic liner may define a first plurality of openings extending between first and second surfaces thereof. The second acoustic liner may be rotatably coupled to the first acoustic liner and at least one of the first acoustic liner and the second acoustic liner may be configured to rotate relative to each other to attenuate one or more frequencies of acoustic energy generated by working fluid flowing past the acoustic resonator assembly. The second acoustic liner may define a second plurality of openings extending between first and second surfaces thereof. A number of degrees of freedom of the acoustic resonator assembly may be varied by rotating the first acoustic liner and/or the second acoustic liner.

8 Claims, 14 Drawing Sheets

(51) Int. Cl.
*G10K 11/16* (2006.01)
*F16L 55/02* (2006.01)

(56) References Cited

U.S. PATENT DOCUMENTS

| | | | | | |
|---|---|---|---|---|---|
| 2,807,329 | A * | 9/1957 | Caldwell | F16L 55/02727 | 181/267 |
| 3,141,519 | A * | 7/1964 | Bottum | F01N 1/165 | 181/241 |
| 3,253,676 | A * | 5/1966 | Bottum | F01N 1/165 | 181/241 |
| 3,910,374 | A * | 10/1975 | Holehouse | G10K 11/172 | 181/292 |
| 3,948,346 | A * | 4/1976 | Schindler | E04B 1/86 | 181/286 |
| 4,715,472 | A * | 12/1987 | McKee | F01N 1/165 | 181/239 |
| 5,930,371 | A * | 7/1999 | Cheng | F01N 1/023 | 381/71.5 |
| 5,997,985 | A * | 12/1999 | Clarke | B32B 3/12 | 181/286 |
| 6,367,580 | B1 * | 4/2002 | Chang | F01N 1/08 | 181/219 |
| 6,601,672 | B2 * | 8/2003 | Liu | F04D 29/4213 | 181/213 |
| 6,732,510 | B2 * | 5/2004 | Ciray | F01N 1/02 | 181/241 |
| 6,810,992 | B1 * | 11/2004 | Lombardo | F01N 1/18 | 116/138 |
| 6,811,372 | B1 * | 11/2004 | Emborg | F02C 7/045 | 181/292 |
| 6,827,180 | B2 * | 12/2004 | Wilson | B32B 3/20 | 181/292 |
| 6,901,752 | B2 * | 6/2005 | Uhler | F01N 1/02 | 181/215 |
| 6,915,876 | B2 * | 7/2005 | Ciray | F01N 1/02 | 181/219 |
| 7,055,484 | B2 * | 6/2006 | Marks | F02B 27/0294 | 123/184.56 |
| 7,484,591 | B2 * | 2/2009 | Kess | F01N 1/165 | 181/227 |
| 7,584,821 | B2 * | 9/2009 | Prior | F02M 35/1216 | 181/241 |
| 7,690,478 | B2 * | 4/2010 | Kostun | F02M 35/1255 | 123/184.57 |
| 7,984,787 | B2 * | 7/2011 | Liu | F16L 55/052 | 181/213 |
| 8,061,961 | B2 * | 11/2011 | Liu | F01D 9/02 | 415/1 |
| 8,286,751 | B2 * | 10/2012 | Furuya | F24F 13/24 | 181/224 |
| 8,316,813 | B2 * | 11/2012 | Prior | F01N 1/006 | 123/184.53 |
| 8,485,310 | B2 * | 7/2013 | Tanabe | G10K 11/172 | 181/224 |
| 8,573,356 | B1 * | 11/2013 | Perdue | E04B 1/994 | 181/284 |
| 2005/0161280 | A1 * | 7/2005 | Furuya | F01N 1/023 | 181/225 |
| 2007/0246292 | A1 * | 10/2007 | Sichau | F01N 1/04 | 181/241 |
| 2008/0314679 | A1 * | 12/2008 | Rowe | F01N 1/16 | 181/241 |
| 2010/0078258 | A1 * | 4/2010 | Tanabe | G10K 11/172 | 181/224 |
| 2015/0071760 | A1 * | 3/2015 | Liu | F04D 29/441 | 415/1 |

* cited by examiner

ACOUSTIC RESONATOR ASSEMBLY HAVING VARIABLE DEGREES OF FREEDOM

BACKGROUND

Reliable and efficient fluid pressurizing devices, such as centrifugal compressors, have been developed and are often utilized in a myriad of industrial processes (e.g., petroleum refineries, offshore oil production platforms, and subsea process control systems). In these devices, undesirably high levels of noise may be generated. For example, in a centrifugal compressor, process fluids may flow through the regions of the impeller outlet and the diffuser inlet at velocities sufficient to generate the high levels of noise. The noise generated may often have a frequency band in a frequency range that human ears may be sensitive to; and thus, may create an undesirable working environment for nearby operators. In addition to presenting a nuisance to the nearby operators, the noise may also result in unintended vibrations and structural damage of the compressors and/or components thereof.

In view of the foregoing, the compressors may often incorporate noise attenuators to reduce the high levels of noise. For example, external attenuators or devices, such as enclosures and wraps, may often be utilized to reduce the high levels of noise. Utilizing the external devices, however, often leads to increased overall cost as the external devices are often provided as an add-on for the already manufactured compressors. Further, the external devices reduce the high levels of noise by insulating structural components of the compressor, and not by reducing the generation and/or excitation of sound waves traversing along or through fluid passages of the compressors. Due to the limitations of the external devices, internal devices, such as acoustic liners or resonators, have been developed and are often disposed adjacent diffuser channels of the compressors to attenuate the noise generated by the process fluids. The acoustic liners may attenuate the high levels of noise by exploiting the Helmholtz resonance principle. For example, the sound waves generated by the process fluids may oscillate through perforations and/or cells formed in the acoustic resonator fluidly coupled with the diffuser channels. The oscillation of the sound waves via the cells may dissipate the acoustic energy and thereby attenuate the noise. The acoustic resonator may also attenuate the noise by providing a local impedance mismatch to reflect the acoustic energy upstream. While the acoustic liners may provide a viable option for attenuating the noise, current designs and/or methods implement acoustic resonators that are "pre-tuned" to attenuate a desired noise frequency, and it is not possible to vary the "pre-tuned" the noise frequency during operation of the compressor. In order to change the "pre-tuned" frequency, the acoustic resonator may need to be removed from the compressor and tuned to the new desired frequency. This may be a time consuming and costly process.

What is needed, then, is an improved system for integrating acoustic resonators in fluid pressurizing devices, such that desired noise frequency to be attenuated may be varied during operation of the fluid pressurizing devices.

SUMMARY

According to an exemplary embodiment, an acoustic resonator assembly may include a first acoustic liner and a second acoustic liner. The first acoustic liner may define a first plurality of openings extending between a first surface of the first acoustic liner and a second surface of the first acoustic liner opposite the first surface of the first acoustic liner. The second acoustic liner may be rotatably coupled to the first acoustic liner. At least one of the first acoustic liner and the second acoustic liner may be configured to rotate relative to each other to attenuate one or more frequencies of acoustic energy generated by working fluid flowing past the acoustic resonator assembly. The second acoustic liner may define a second plurality of openings extending between a first surface of the second acoustic liner and a second surface of the second acoustic liner opposite the first surface of the second acoustic liner.

According to an exemplary embodiment, an acoustic resonator assembly may include a first annular acoustic liner, a second annular acoustic liner, and an annular disk. The first annular acoustic liner may define a first plurality of openings extending between a first annular surface of the first annular acoustic liner and a second annular surface of the first annular acoustic liner opposite the first annular surface of the first annular acoustic liner. The second annular acoustic liner may define a second plurality of openings extending between a first annular surface of the second annular acoustic liner and a second annular surface of the second annular acoustic liner opposite the first annular surface of the second annular acoustic liner. The annular disk may define a third plurality of openings extending between a first annular surface of the annular disk and a second annular surface of the annular disk opposite the first annular surface of the annular disk. The annular disk may be disposed between the first annular acoustic liner and the second annular acoustic liner. The annular disk may be configured to rotate relative to the first annular acoustic liner and the second annular acoustic liner to attenuate one or more frequencies of acoustic energy generated by working fluid flowing past the acoustic resonator assembly.

According to an exemplary embodiment, a fluid pressurizing device may include a casing defining a cavity and having an impeller arranged for rotation within the cavity, the cavity may be fluidly coupled to an inlet conduit and a diffuser channel. The fluid pressurizing device may further include a first acoustic resonator assembly coupled to a diffuser wall defined in the diffuser channel and configured to reduce acoustic energy generated in the fluid pressurizing device. The first acoustic resonator assembly may include a first annular acoustic liner and a second annular acoustic liner. The first annular acoustic liner may define a first plurality of openings extending between a first annular surface of the first acoustic liner and a second annular surface of the first annular acoustic liner opposite the first annular surface of the first annular acoustic liner. The second annular acoustic liner may be rotatably coupled to the first annular acoustic liner. At least one of the first acoustic liner and the second annular acoustic liner may be configured to rotate relative to each other to attenuate one or more frequencies of acoustic energy generated by the fluid pressurizing device. The second annular acoustic liner may define a second plurality of openings extending between a first annular surface of the second annular acoustic liner and a second annular surface of the second annular acoustic liner opposite the first annular surface of the second annular acoustic liner.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1B:
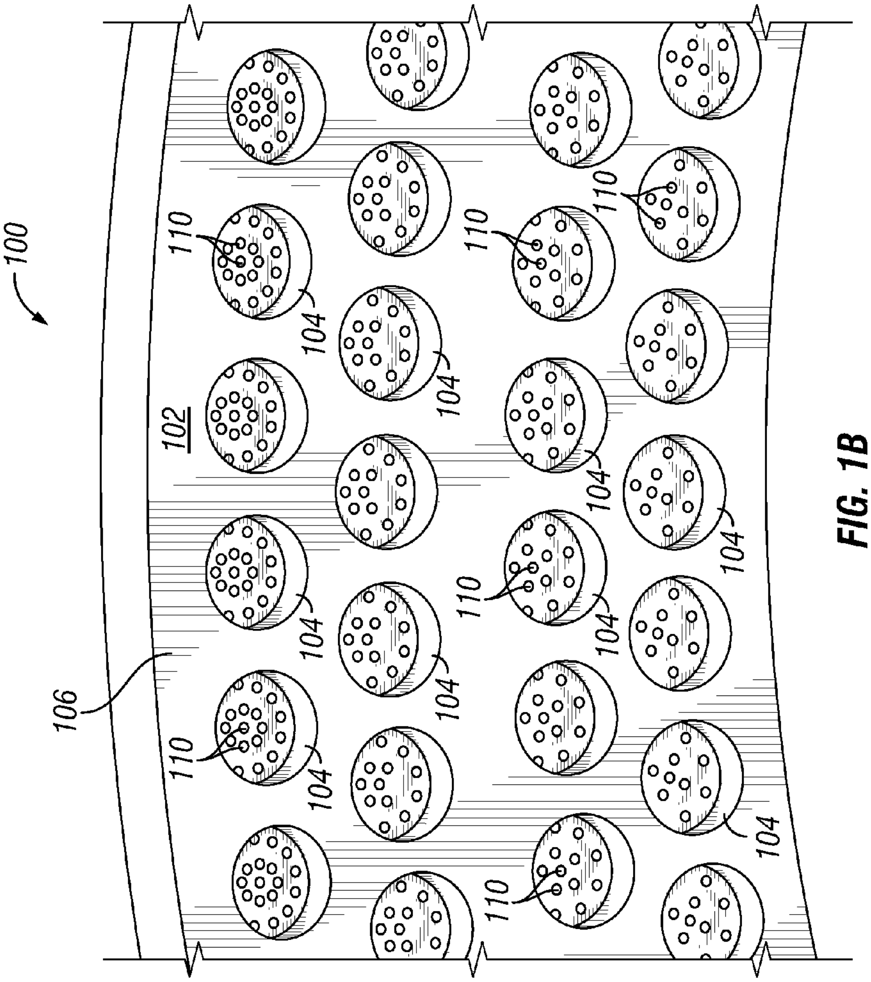
FIG. 1B illustrates a perspective view of a portion of the acoustic resonator assembly of FIG. 1A, according to one or more embodiments disclosed.

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1A:
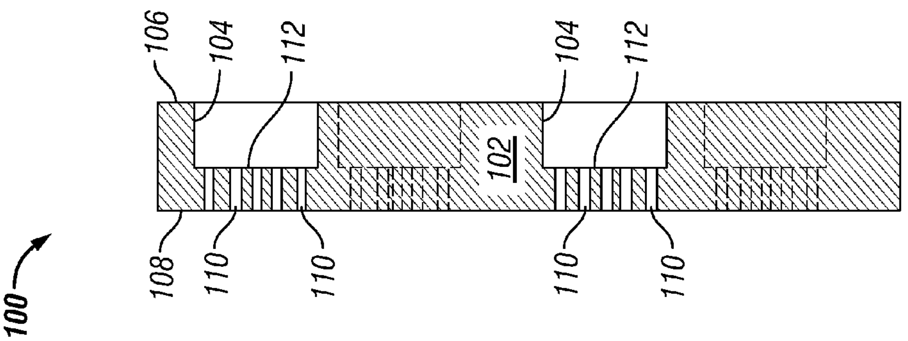
FIG. 1A illustrates a partial, cross-sectional view of an acoustic resonator assembly, according to one or more embodiments disclosed.

FIG. 1A illustrates a partial, cross-sectional view of an acoustic resonator assembly 100, according to one or more embodiments disclosed. FIG. 1B illustrates a perspective view of a portion of the acoustic resonator assembly 100 of FIG. 1A, according to one or more embodiments disclosed. The acoustic resonator assembly 100 may be or include a liner, such as an annular liner 102. As illustrated in FIGS. 1A and 1B, the annular liner 102 of the acoustic resonator assembly 100 may define a series of cells 104, or openings, at least partially extending from a first annular surface 106 of the annular liner 102 toward a second annular surface 108 of the annular liner 102. In at least one embodiment, the cells 104 may be randomly disposed on the first annular surface 106 of the annular liner 102. In another embodiment, the cells 104 may be arranged in an ordered pattern on the first annular surface 106 of the annular liner 102. For example, as illustrated in FIG. 1B, the cells 104 may be arranged as one or more rows extending annularly along the first annular surface 106 of the annular liner 102. As further illustrated in FIG. 1B, the cells 104 in one of the annularly extending rows may be staggered or offset with respect to the cells 104 in an adjacent row.

As further illustrated in FIG. 1A, the annular liner 102 of the acoustic resonator assembly 100 may define a series of holes 110, or openings, extending from an inner end surface 112 of each of the cells 104 to the second annular surface 108 of the annular liner 102. A plurality of the holes 110 may be associated with each of the cells 104. In at least one embodiment, the plurality of holes 110 may be randomly disposed along the inner end surface 112 of each of the cells 104. In another embodiment, the plurality of holes 110 may be disposed as an ordered pattern along the inner end surface 112 of each of the cells 104. While FIGS. 1A and 1B illustrate the cells 104 as having a circular or disc-like cross-section, and the holes 110 as bores, the shapes of the cells 104 and the holes 110 are merely exemplary. Accordingly, it may be appreciated that the shapes of the cells 104 and the holes 110 may vary without departing from the scope of the disclosure. In at least one embodiment, the first annular surface 106 may be parallel to the second annular surface 108 and/or the inner end surface 112 of the cells 104. In another embodiment, the first annular surface 106 may be angled or have an angular orientation relative to the second annular surface 108 and/or the inner end surface 112 of the cells 104.

Figure 2A:
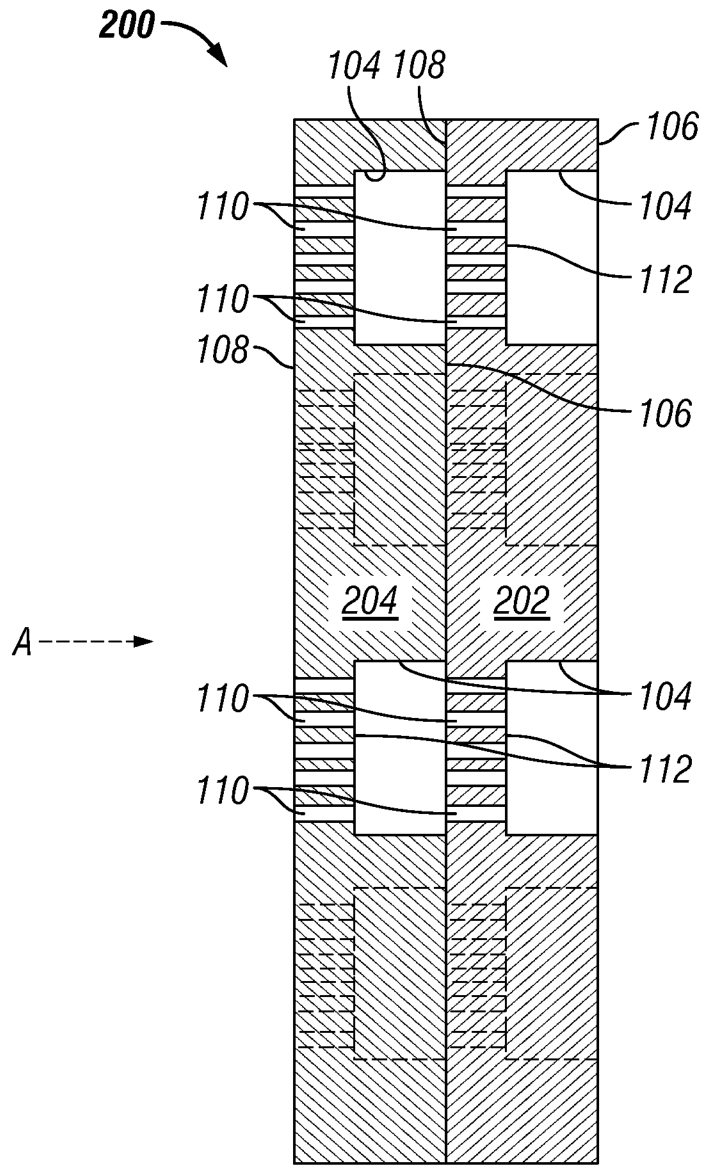
FIG. 2A illustrates a partial cross-sectional of an acoustic resonator assembly including two acoustic liners of FIGS. 1A and 1B, according to one or more embodiments disclosed.

FIG. 2A illustrates a partial cross-sectional view of an acoustic resonator assembly 200 including two acoustic liners 202 and 204 in series, according to one or more embodiments disclosed. The acoustic resonator assembly 200 may include a first acoustic liner 202 and a second acoustic liner 204 rotatably coupled with each other such that either the first acoustic liner 202 and the second acoustic liner 204, or both, may rotate relative to each other. The first acoustic liner 202 and the second acoustic liner 204 may be similar in some respects to the acoustic liner 102 illustrated in FIGS. 1A and 1B described above and therefore may be best understood with reference to the description of FIGS. 1A and 1B where like numerals designate like components and will not be described again in detail. In FIG. 2A, the first acoustic liner 202 and the second acoustic liner 204 may both be annular in shape. The first acoustic liner 202 and the second acoustic liner 204 may each define a series of cells 104, or openings, at least partially extending from a respective first annular surface 106 toward a respective second annular surface 108. The second annular surface 108 of the first acoustic liner 202 may be rotatably coupled to the first annular surface 106 of the second acoustic liner 204.

As illustrated in FIG. 2A, the cells 104 of the first acoustic liner 202 and the cells 104 of the second acoustic liner 204 are illustrated as completely overlapping each other. As a result, the plurality of holes 110 of the first acoustic liner 202 may be in fluid communication with the corresponding cell 104 of the second acoustic liner 204.

Figure 2B:
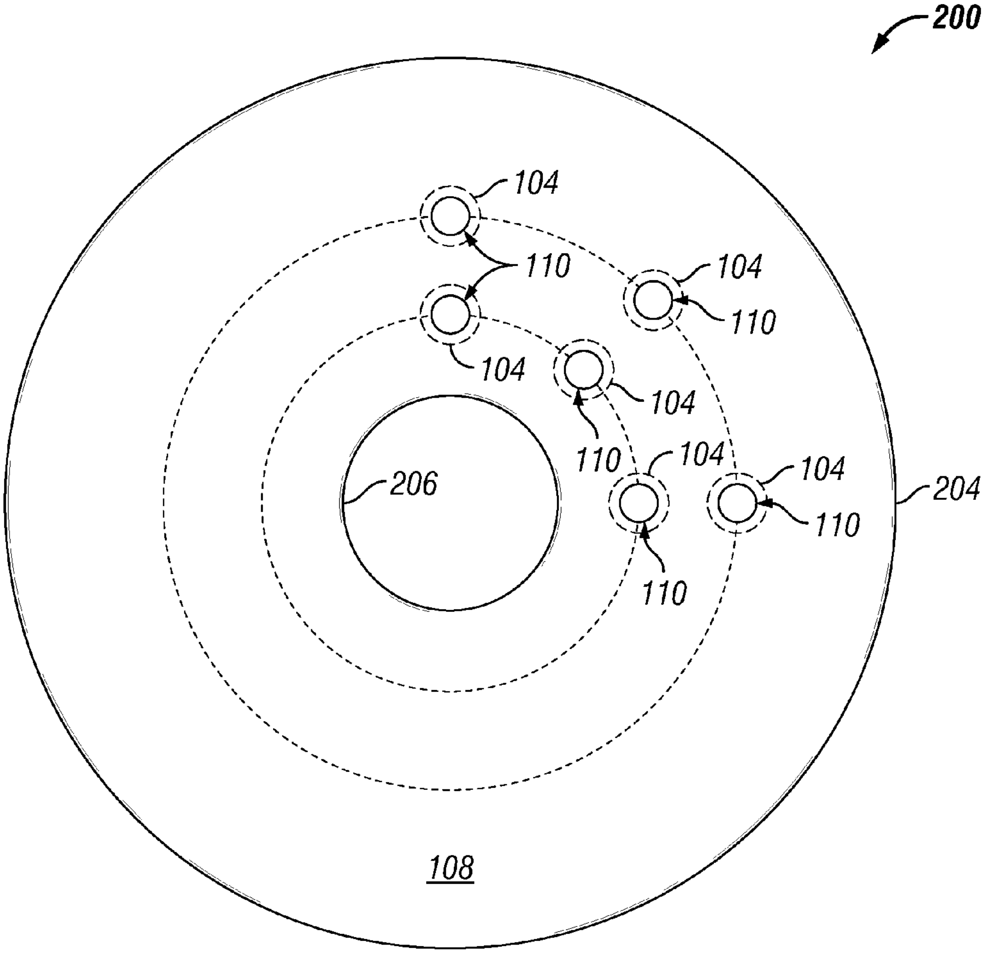
FIG. 2B illustrates an axial view of the acoustic resonator assembly in FIG. 2A in the direction of the arrow A in FIG. 2A, according to one or more embodiments disclosed.

FIG. 2B illustrates an axial view of the acoustic resonator assembly 200 in the direction of the arrow A in FIG. 2A, according to one or more embodiments disclosed. As illustrated in FIG. 2B, the cells 104 of each of the first acoustic liner 202 and the second acoustic liner 204 are completely aligned (or completely overlapped) with each other. It may be noted that FIG. 2B illustrates only some of the plurality of holes 110 and the corresponding cells 104 of the second acoustic liner 204 for the sake of brevity, and the dashed annular rings indicate that the plurality of holes 110 and the corresponding cells 104 are disposed in a circular manner on the second annular surface 108 of the second acoustic liner 204.

Figure 2C:
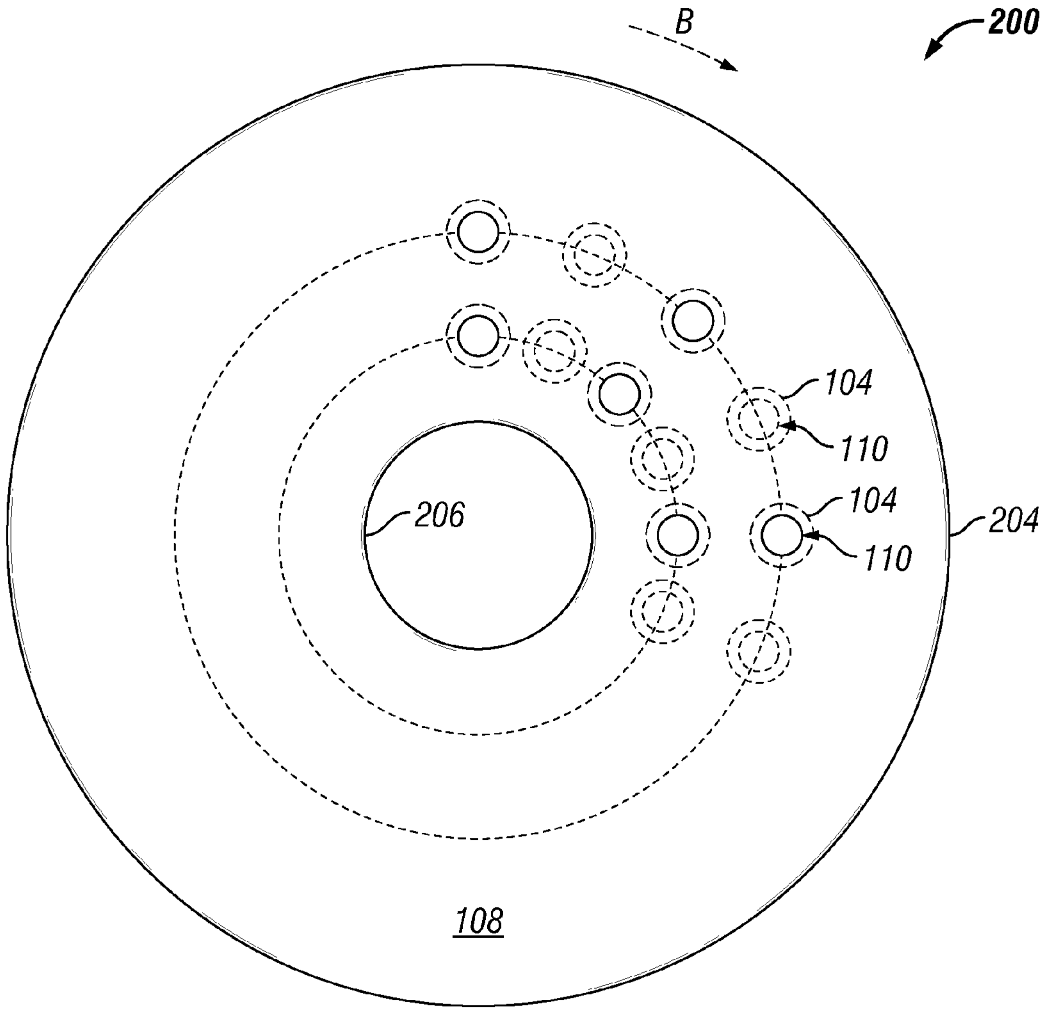
FIG. 2C illustrates another axial view of the acoustic resonator assembly in FIGS. 2A and 2B as viewed in the direction of the arrow A in FIG. 2A, according to one or more embodiments disclosed.

As will be appreciated, the acoustic resonator assembly 200 in FIGS. 2A and 2B may be characterized as having two degrees of freedom. The number of degrees of freedom of the acoustic resonator assembly 200 may be reduced to one by rotating the first acoustic liner 202 and/or the second acoustic liner 204 such that the second annular surface 108 of the first acoustic liner 202 may overlap with the cells 104 of the second acoustic liner 204. FIG. 2C illustrates an axial view of the acoustic resonator assembly 200 in the direction of the arrow A in FIG. 2A with the first acoustic liner 202 rotated clockwise as indicated by the arrow B, according to one or more embodiments disclosed. As a result, fluidic communication between the plurality of holes 110 of the first acoustic liner 202 and the cells 104 of the second acoustic liner 204 may be interrupted, and the acoustic resonator assembly 200 in FIG. 2C may be characterized as having one degree of freedom. By reducing the degree of freedom of the acoustic resonator assembly 200 from two to one, a number of frequencies of the acoustic energy that may be attenuated by the acoustic resonator assembly 200 may be reduced compared to a number of frequencies attenuated when the acoustic resonator assembly 200 is characterized as having two degrees of freedom.

As explained further below, the acoustic resonator assembly 200 may be used in a fluid compression device (e.g., centrifugal compressor, an axial compressor, a back-to-back compressor, or the like) to attenuate the acoustic energy generated by the working fluid therein. The acoustic resonator assembly 200 may be installed in the fluid compression device such that working fluid may flow over the plurality of holes 110 of the second acoustic liner 204. The first and second acoustic liners 202, 204 may be configured such that they may be rotated during operation of the fluid compression device and the acoustic resonator assembly 200 may thus provide an increased frequency band across which acoustic energy generated by the working fluid in the fluid compression device may be attenuated and/or provide a relatively greater overall acoustic energy attenuation. In embodiments, the first acoustic liner 202 and/or the second acoustic liner 204 may be rotated hydraulically, pneumatically, mechanically, manually, and/or in a variety of other manners known in the art. In other embodiments, the first acoustic liner 202 and/or the second acoustic liner 204 may be rotated via remote control.

The mechanism for rotating the first acoustic liner 202 and/or the second acoustic liner 204 may include one or more process control systems. In some embodiments, one or more of the process control systems may be communicably connected, wired and/or wirelessly, with numerous sets of sensors, valves, and pumps, in order to measure acoustic energy of the working fluid in the fluid compression device. In response to the measured acoustic energy, the process control systems may be operable to selectively rotate the first acoustic liner 202 and/or the second acoustic liner 204 in accordance with a control program or algorithm, thereby maximizing acoustic energy attenuation. Further, in certain embodiments, the process control system, as well as any other controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof.

Referring again to FIG. 2C, it will be understood that FIG. 2C illustrates (in phantom) only some of the plurality of holes 110 and the corresponding cells 104 of the first acoustic liner 202 for the sake of brevity, and the dashed annular rings indicate that the plurality of holes 110 and the corresponding cells 104 are disposed in a circular manner on the first annular surface 106 of the first acoustic liner 202. It should also be noted that FIGS. 2B and 2C indicate a general location of the plurality of holes 110. FIGS. 2B and 2C also illustrate the acoustic resonator assembly 200 defining a shaft hole 206 for a shaft of the fluid compression device to extend therethrough.

Figure 3:
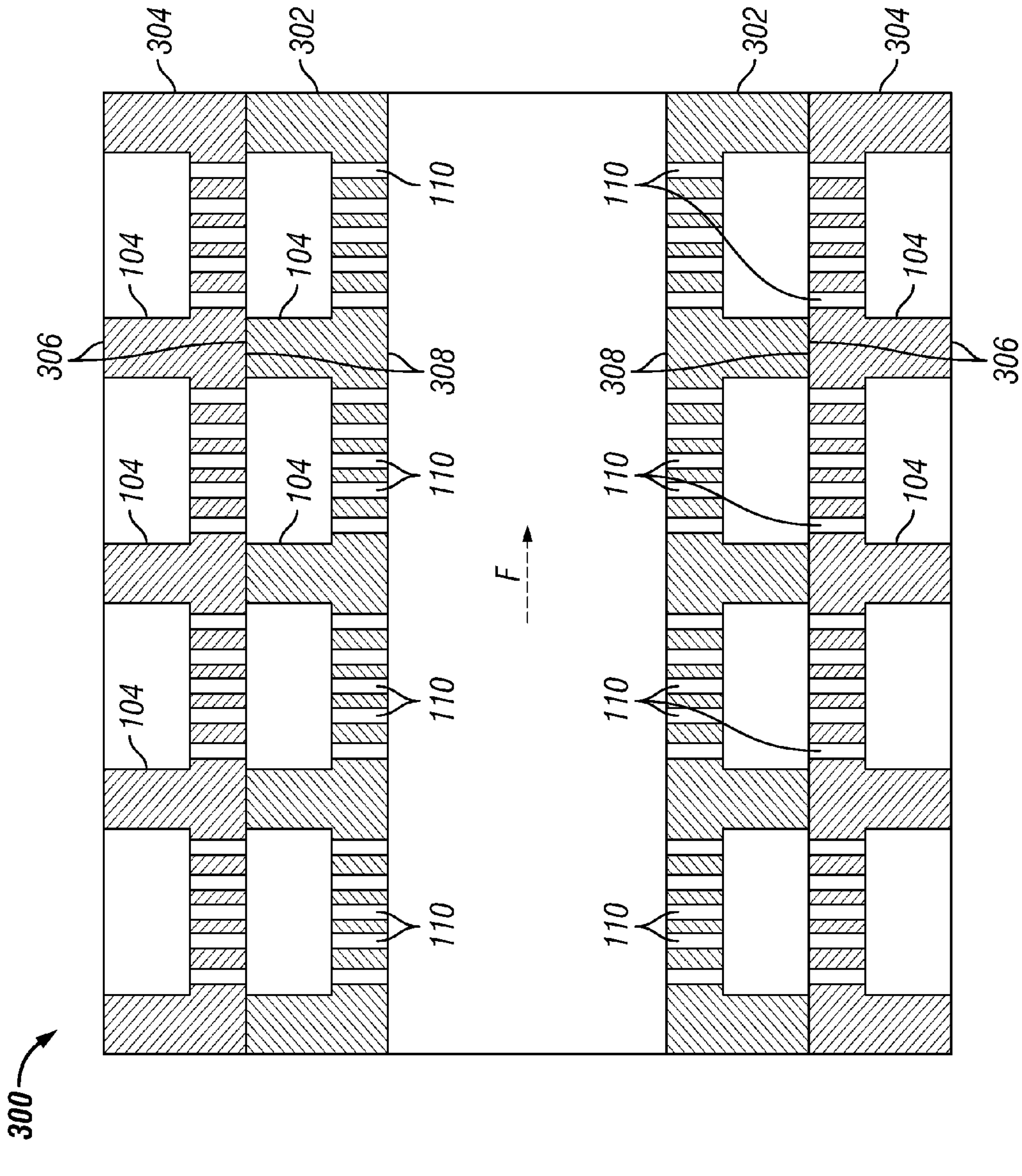
FIG. 3 illustrates a partial cross-sectional view of an acoustic resonator assembly, according to one or more embodiments disclosed.

FIG. 3 illustrates a partial cross-sectional view of an acoustic resonator assembly 300, according to one or more embodiments disclosed. The acoustic resonator assembly 300 may be generally cylindrical in shape and may include two cylindrical acoustic liners 302 and 304 that may be disposed concentrically with respect to each other. The first and second acoustic liners 302 and 304 may be similar in some respects to the acoustic liner 102 illustrated in FIGS. 1A and 1B described above and therefore may be best understood with reference to the description of FIGS. 1A and 1B where like numerals designate like components and will not be described again in detail. Each of the first and second acoustic liners 302 and 304 may define an outer circumferential surface 306 and an inner circumferential surface 308. The first and second acoustic liners 302 and 304 may be rotatably coupled to each other with the outer circumferential surface 306 of the first acoustic liner 302 contacting the inner circumferential surface 308 of the second acoustic liner 304.

The acoustic resonator assembly 300 may operate similar to the acoustic resonator assembly 200 described above and the detailed description thereof will be omitted herein for the sake of brevity. Briefly, the first and second acoustic liners 302 and 304 may rotate relative to each other to vary the degree of freedom of the acoustic resonator assembly 300 between one and two. The acoustic resonator assembly 300 may also be used in a fluid compression device (e.g., centrifugal compressor, an axial compressor, a back-to-back compressor, or the like) and/or fluid-carrying conduits, such as oil and gas pipelines, to attenuate the acoustic energy generated by the working fluid therein. As will be understood, the acoustic resonator assembly 300 may be installed such that working fluid in the fluid compression device and/or the oil and gas pipelines may traverse the plurality of holes 110 of the first acoustic liner 302, as generally indicated by the arrow F. However, it will be understood that the working fluid may also flow in a direction opposite to arrow F. The first and second acoustic liners 302, 304 may be configured such that they may be rotated during the operation of the fluid compression device and/or the oil and gas pipelines, and the acoustic resonator assembly 300 may thus provide an increased frequency band across which acoustic energy generated by the working fluid in the fluid compression device and/or the oil and gas pipelines may be attenuated and/or provide a relatively greater overall acoustic energy attenuation.

Figure 4A:
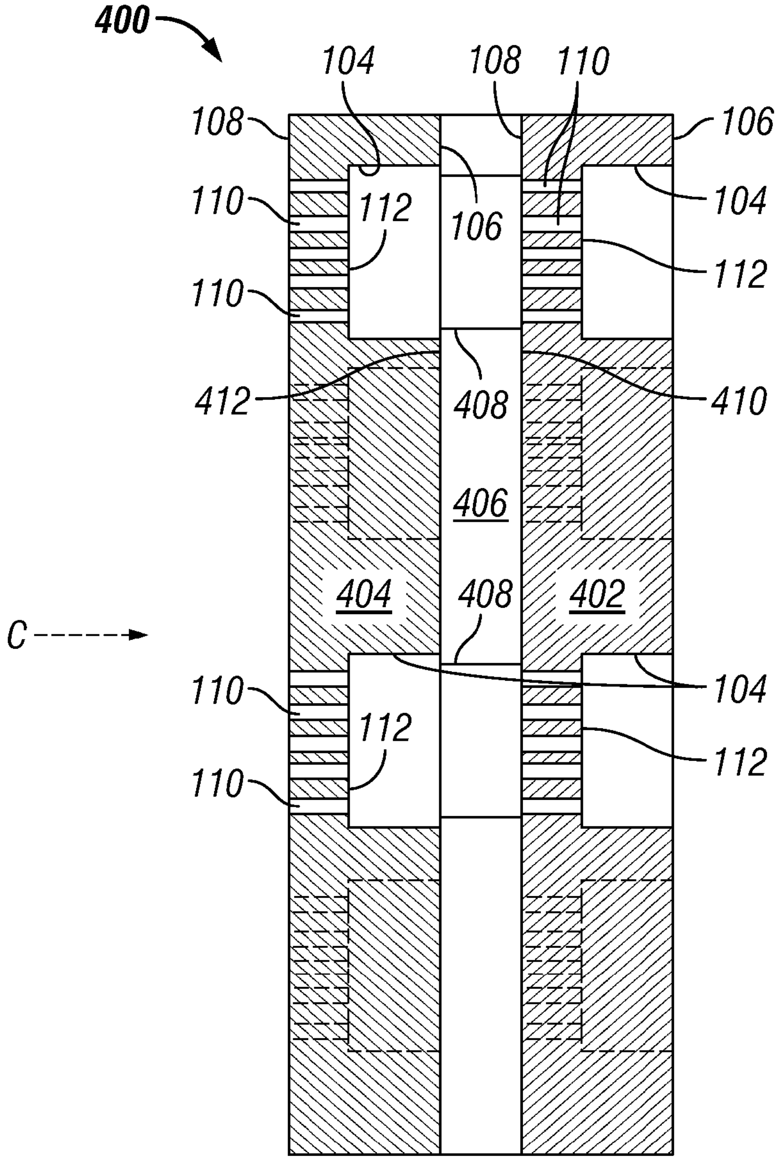
FIG. 4A illustrates a partial cross-sectional view of an acoustic resonator assembly, according to one or more embodiments disclosed.

FIG. 4A illustrates a partial cross-sectional view of an acoustic resonator assembly 400, according to one or more embodiments disclosed. The acoustic resonator assembly 400 may include an annular disk 406 rotatably disposed between an annular first acoustic liner 402 and an annular second acoustic liner 404 and the annular disk 406 may be in contact with the first acoustic liner 402 and the second acoustic liner 404. The first acoustic liner 402 and the second acoustic liner 404 may be similar in some respects to the acoustic liner 102 illustrated in FIGS. 1A and 1B described above and therefore may be best understood with reference to the description of FIGS. 1A and 1B where like numerals designate like components and will not be described again in detail. The annular disk 406 may rotate relative to the first acoustic liner 402 and the second acoustic liner 404. The annular disk 406 may define a plurality of openings 408 (also see FIG. 40) axially extending between a first annular surface 410 and a second annular surface 412 of the annular disk 406. In an embodiment, the plurality of openings 408 may mirror the plurality of holes 110 of the first acoustic liner 402. The plurality of openings 408 may selectively provide fluid communication between the plurality of cells 104 of the second acoustic liner 404 and the plurality of holes 110 of the first acoustic liner 402. The first annular surface 410 of the annular disk 406 may contact the second annular surface 108 of the first acoustic liner 402 and the second annular surface 412 of the annular disk 406 may contact the first annular surface 106 of the second acoustic liner 404.

Figure 4B:
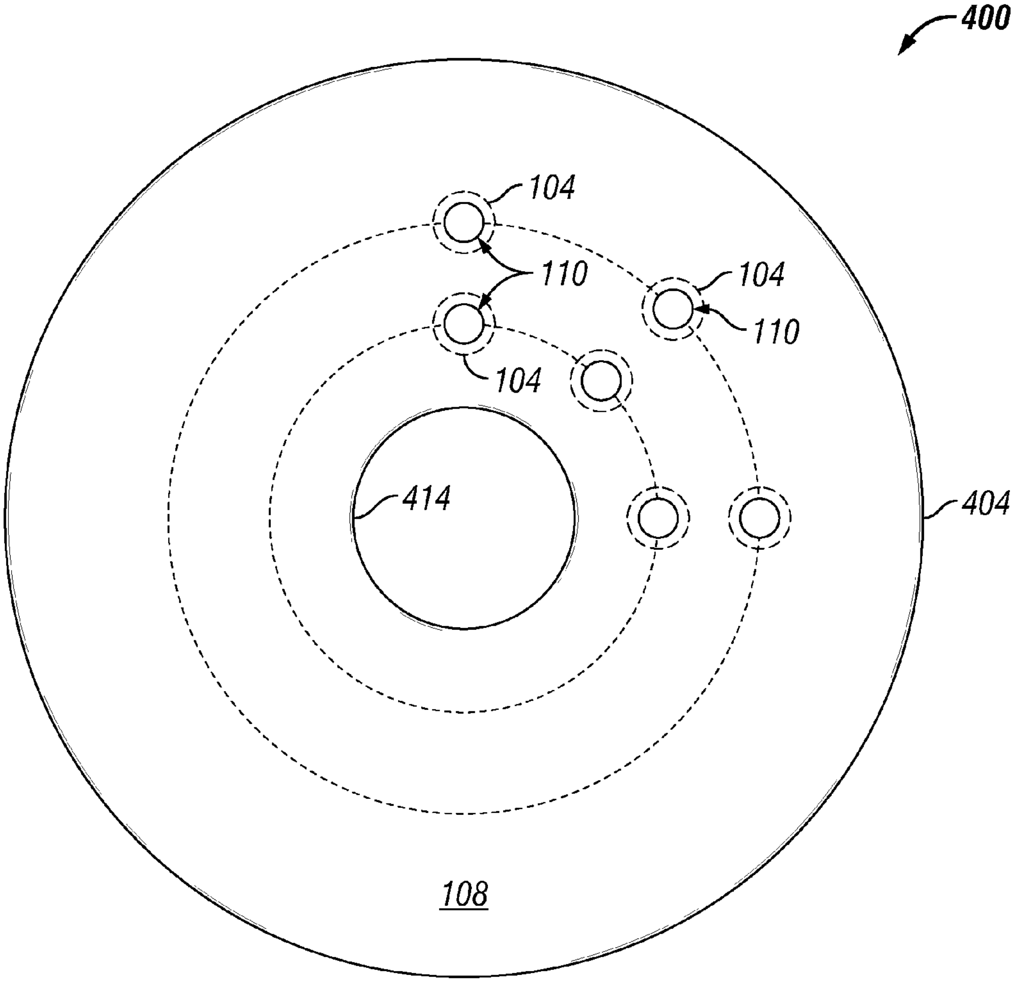
FIG. 4B illustrates an axial view of the acoustic resonator assembly in FIG. 4A as viewed in the direction of the arrow C in FIG. 4A, according to one or more embodiments disclosed.

FIG. 4B illustrates an axial view of the acoustic resonator assembly 400 in the direction of the arrow C in FIG. 4A, according to one or more embodiments disclosed. As illustrated, at least one opening 408 may overlap the plurality of holes 110 of the first acoustic liner 402 and at least one cell 104 of the second acoustic liner 404, thereby providing fluid communication therebetween. In FIG. 4B, the first acoustic liner 402 and the second acoustic liner 404 are positioned such that the cells 104 of each of the first acoustic liner 402 and the second acoustic liner 404 are completely aligned (or completely overlapped) with each other. It may be noted that FIG. 4B illustrates only some of the plurality of holes 110 and the corresponding cells 104 of the second acoustic liner 404 for the sake of brevity, and the dashed annular rings indicate that the plurality of holes 110 and the corresponding cells 104 are disposed in a circular manner on the second annular surface 108 of the second acoustic liner 404.

As will be appreciated, the acoustic resonator assembly 400 in FIGS. 4A and 4B may be characterized as having two degrees of freedom. The number of degrees of freedom of the acoustic resonator assembly 400 may be reduced to one by rotating (FIG. 4C) the annular disk 406 such that at least one opening 408 may not overlap the plurality of holes 110 of the first acoustic liner 402 and at least one cell 104 of the second acoustic liner 404. By reducing the degree of freedom of the acoustic resonator assembly 400 from two to one, a number of frequencies of the acoustic energy that may be attenuated by the acoustic resonator assembly 400 may be reduced compared to a number of frequencies attenuated when the acoustic resonator assembly 400 is characterized as having two degrees of freedom.

Figure 4C:
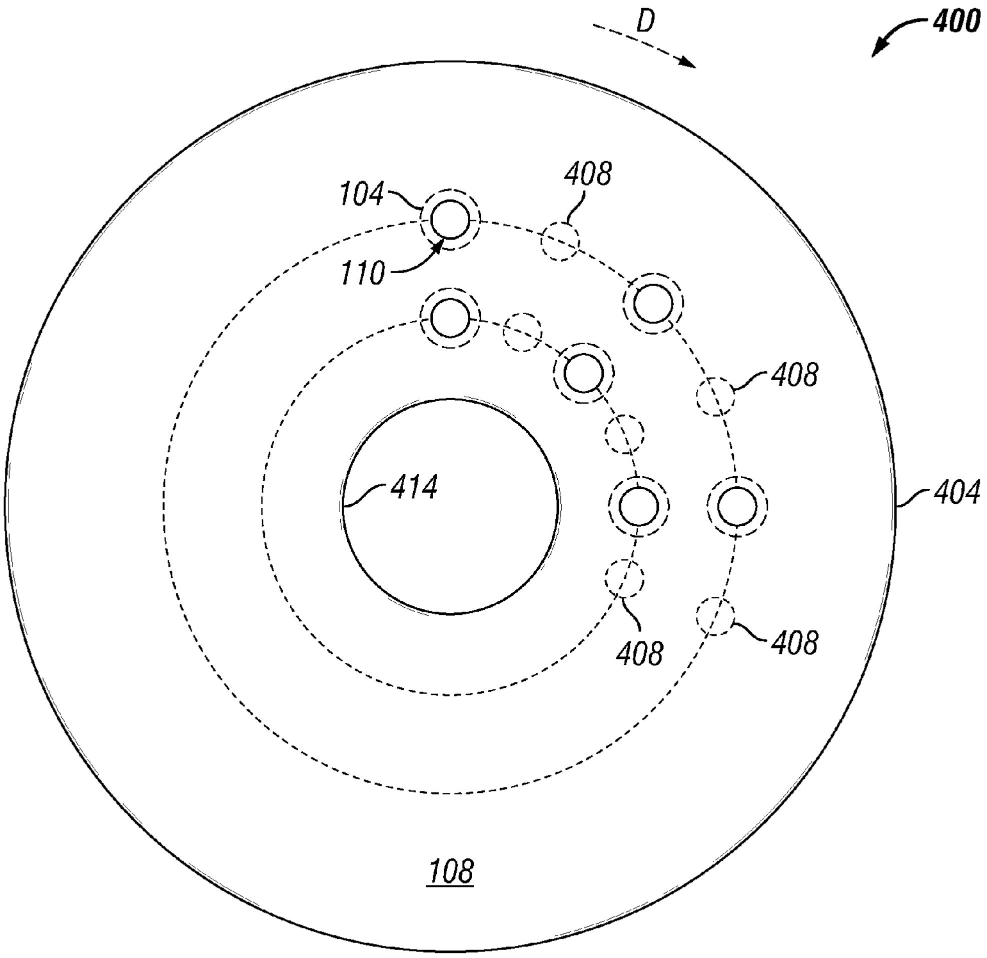
FIG. 4C illustrates another axial view of the acoustic resonator assembly in FIGS. 4A and 4B as viewed in the direction of the arrow C in FIG. 4A, according to one or more embodiments disclosed.

FIG. 4C illustrates an axial view of the acoustic resonator assembly 400 in the direction of the arrow C in FIG. 4A with the annular disk 406 rotated clockwise as indicated by the arrow D, according to one or more embodiments disclosed. As a result, the fluid communication between the plurality of holes 110 of the first acoustic liner 402 and at least one cell 104 of the second acoustic liner 404 may be interrupted, and the acoustic resonator assembly 400 in FIG. 4C may be characterized as having one degree of freedom. It will be understood that FIG. 4C illustrates (in phantom) only some of the openings 408 of the annular disk 406 for the sake of brevity, and the dashed annular rings indicate that the plurality of openings 408 may be disposed in a circular manner on the annular disk 406. It should also be noted that FIGS. 4B and 4C indicate a general location of the plurality of holes 110. FIGS. 4B and 4C also illustrate the acoustic resonator assembly 400 defining a shaft hole 414 for a shaft of a fluid compression device to extend therethrough.

As explained further below, the acoustic resonator assembly 400 may be used in a fluid compression device (e.g., centrifugal compressor, an axial compressor, a back-to-back compressor, or the like) to attenuate the acoustic energy generated by the working fluid therein. As will be understood, the acoustic resonator assembly 400 may be installed in the fluid compression device such that working fluid may traverse the plurality of holes 110 of the second acoustic liner 404. The annular disk 406 may be configured such that it may be rotated during the operation of the fluid compression device, and the acoustic resonator assembly 400 may thus provide an increased frequency band across which acoustic energy generated by the working fluid in the fluid compression device may be attenuated and/or provide a relatively greater overall acoustic energy attenuation. In embodiments, the annular disk 406 may be rotated hydraulically, pneumatically, mechanically, manually, and/or in a variety of other manners known in the art. In other embodiments, the annular disk 406 may be rotated via remote control.

The mechanism for rotating the annular disk 406 may include one or more process control systems. In some embodiments, one or more of the process control systems may be communicably connected, wired and/or wirelessly, with numerous sets of sensors, valves, and pumps, in order to measure acoustic energy of the working fluid in the fluid compression device. In response to the measured acoustic energy, the process control systems may be operable to selectively rotate the annular disk 406 in accordance with a control program or algorithm, thereby maximizing acoustic energy attenuation. Further, in certain embodiments, the process control system, as well as any other controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof.

Figure 5A:
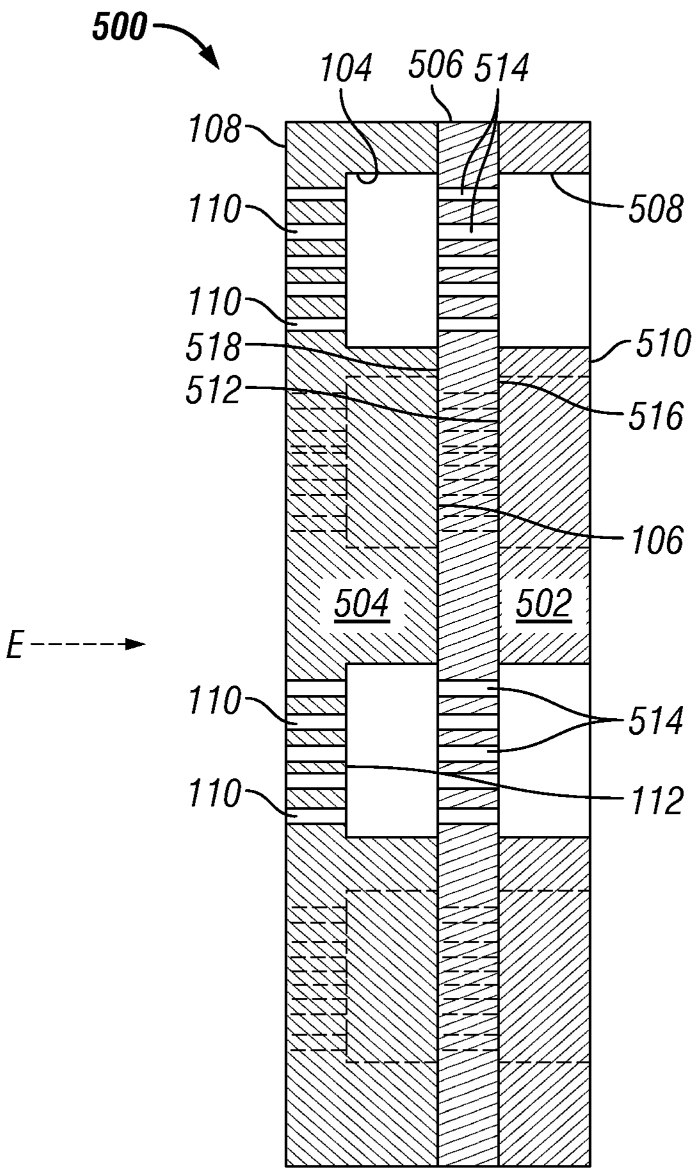
FIG. 5A illustrates a partial cross-sectional view of an acoustic resonator assembly, according to one or more embodiments disclosed.

FIG. 5A illustrates a partial cross-sectional view of an acoustic resonator assembly 500, according to one or more embodiments disclosed. The acoustic resonator assembly 500 may include an annular disk 506 rotatably disposed between an annular first acoustic liner 502 and an annular second acoustic liner 504 and the annular disk 506 may be in contact with the first acoustic liner 502 and the second acoustic liner 504. The second acoustic liner 504 may be similar in some respects to the acoustic liner 102 illustrated in FIGS. 1A and 1B described above and therefore may be best understood with reference to the description of FIGS. 1A and 1B where like numerals designate like components and will not be described again in detail. The first acoustic liner 502 may define a plurality of openings 508 similar to the plurality of cells 104 defined by the acoustic liner 102. For instance, the dimensions of the plurality of openings 508 may be similar to the dimensions of the plurality of cells 104. The plurality of openings 508 may extend axially from a first annular surface 510 of the first acoustic liner 502 to a second annular surface 512 of the first acoustic liner 502. A first annular surface 516 of the annular disk 506 may contact the second annular surface 512 of the first acoustic liner 502 and a second annular surface 518 of the annular disk 506 may contact the first annular surface 106 of the second acoustic liner 504. The annular disk 506 may define a series of holes 514, or openings, extending axially from a first annular surface 516 of the annular disk 506 to a second annular surface 518 of the annular disk 506. A set including one or more holes 514 may be associated with each of the openings 508. The annular disk 506 may rotate relative to the first acoustic liner 502 and the second acoustic liner 504. Rotating the annular disk 506 may selectively provide fluid communication between the plurality of cells 104 of the second acoustic liner 504 and the plurality of openings 508 of the first acoustic liner 502.

Figure 5B:
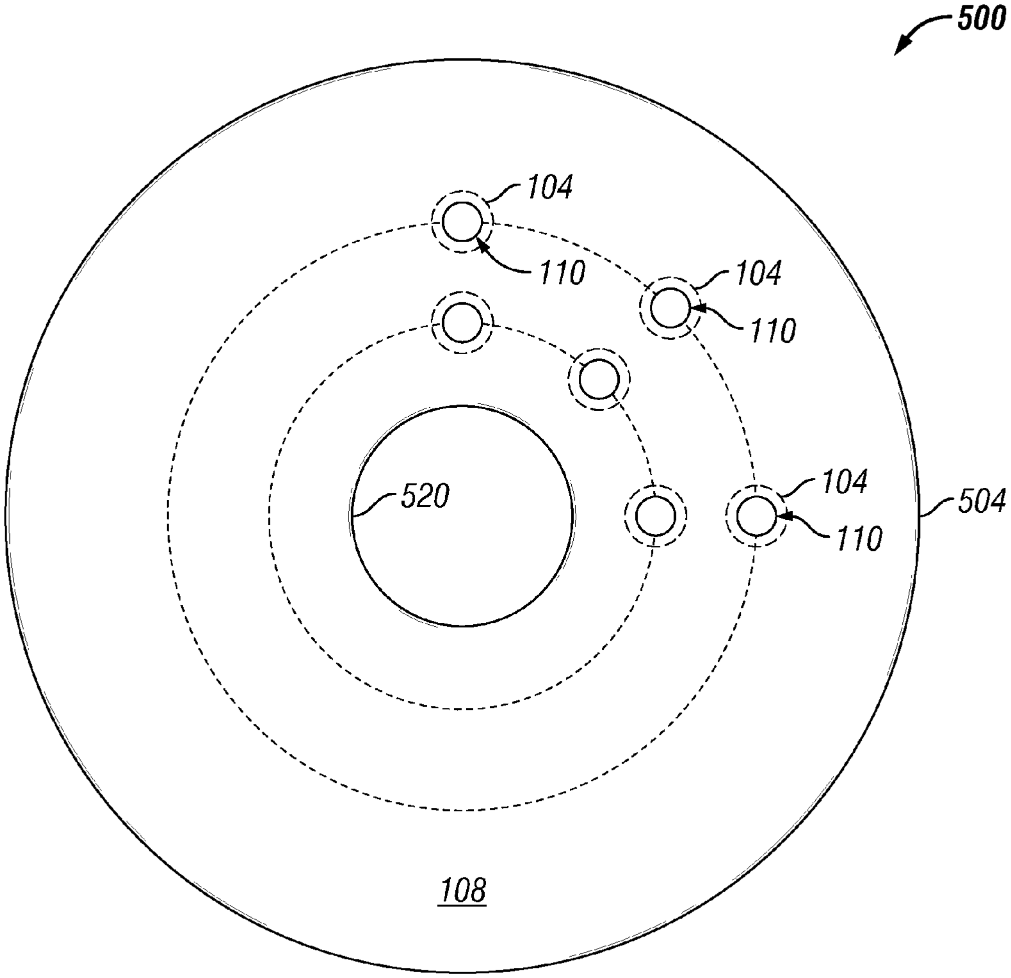
FIG. 5B illustrates an axial view of the acoustic resonator assembly in FIG. 5A as viewed in the direction of arrow E in FIG. 5A, according to one or more embodiments disclosed.

FIG. 5B illustrates an axial view of the acoustic resonator assembly 500 in the direction of the arrow E in FIG. 5A, according to one or more embodiments disclosed. In the configuration illustrated in FIGS. 5A and 5B, at least one opening 508 may completely align (or completely overlap) with a set of holes 514 of the annular disk 506, thereby providing fluid communication between the cells 104 of the second acoustic liner 504 and the plurality of openings 508 in the first acoustic liner 502. It may be noted that FIG. 5B illustrates only some of the plurality of holes 110 and the corresponding cells 104 of the second acoustic liner 504 for the sake of brevity, and, as indicated by the dashed annular rings, the plurality of holes 110 and the corresponding cells 104 are disposed in a circular manner on the second annular surface 108 of the second acoustic liner 504.

As will be appreciated, the acoustic resonator assembly 500 in FIGS. 5A and 5B may be characterized as having two degrees of freedom. The number of degrees of freedom of the acoustic resonator assembly 500 may be reduced to one by rotating (see FIG. 5C) the annular disk 506 such that the set of holes 514 may not overlap the cells 104 of the second acoustic liner 504 and the plurality of openings 508 of the first acoustic liner 502. By reducing the degree of freedom of the acoustic resonator assembly 500 from two to one, a number of frequencies of the acoustic energy that may be attenuated by the acoustic resonator assembly 500 may be reduced compared to a number of frequencies attenuated when the acoustic resonator assembly 500 is characterized as having two degrees of freedom.

Figure 5C:
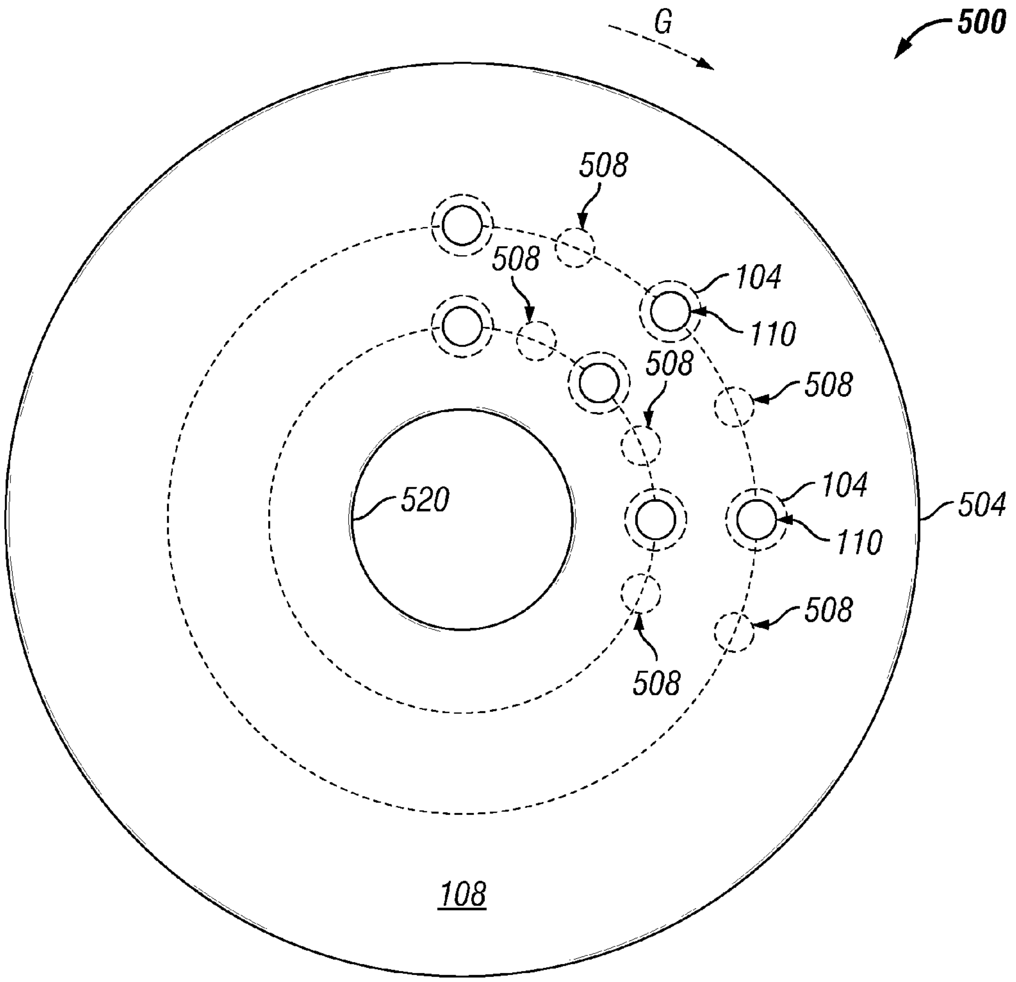
FIG. 5C illustrates another axial view of the acoustic resonator assembly in FIGS. 5A and 5B as viewed in the direction of the arrow E in FIG. 5A, according to one or more embodiments disclosed.

FIG. 5C illustrates the axial view of the acoustic resonator assembly 500 in the direction of the arrow E in FIG. 5A with the annular disk 506 rotated clockwise as indicated by the arrow G, according to one or more embodiments disclosed. As a result, the fluid communication between the cells 104 of the second acoustic liner 504 and the plurality of openings 508 of the first acoustic liner 502 may be interrupted, and the acoustic resonator assembly 500 may be characterized as having one degree of freedom. It will be understood that FIG. 5C illustrates (in phantom) only some of the openings 508 of the annular disk 506 for the sake of brevity, and the dashed annular rings indicate that the plurality of openings 508 may be disposed in a circular manner on the annular disk 506. It should also be noted that FIGS. 5B and 5C indicate a general location of the plurality of holes 110. FIGS. 5B and 5C also illustrate the acoustic resonator assembly 500 defining a shaft hole 520 for a shaft of a fluid compression device to extend therethrough.

As explained further below, the acoustic resonator assembly 500 may be used in a fluid compression device (e.g., centrifugal compressor, an axial compressor, a back-to-back compressor, or the like) to attenuate the acoustic energy generated by the working fluid therein. As will be understood, the acoustic resonator assembly 500 may be installed in the fluid compression device such that working fluid may traverse the plurality of holes 110 of the second acoustic liner 504. The annular disk 506 may be configured such that it may be rotated during the operation of the fluid compression device, and the acoustic resonator assembly 500 may thus provide an increased frequency band across which acoustic energy generated by the working fluid in the fluid compression device may be attenuated and/or provide a relatively greater overall acoustic energy attenuation. In embodiments, the annular disk 506 may be rotated hydraulically, pneumatically, mechanically, manually, and/or in a variety of other manners known in the art. In other embodiments, the annular disk 506 may be rotated via remote control.

The mechanism for rotating the annular disk 506 may include one or more process control systems. In some embodiments, one or more of the process control systems may be communicably connected, wired and/or wirelessly, with numerous sets of sensors, valves, and pumps, in order to measure acoustic energy of the working fluid in the fluid compression device. In response to the measured acoustic energy, the process control systems may be operable to selectively rotate the annular disk 506 in accordance with a control program or algorithm, thereby maximizing acoustic energy attenuation. Further, in certain embodiments, the process control system, as well as any other controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof.

Figure 6A:
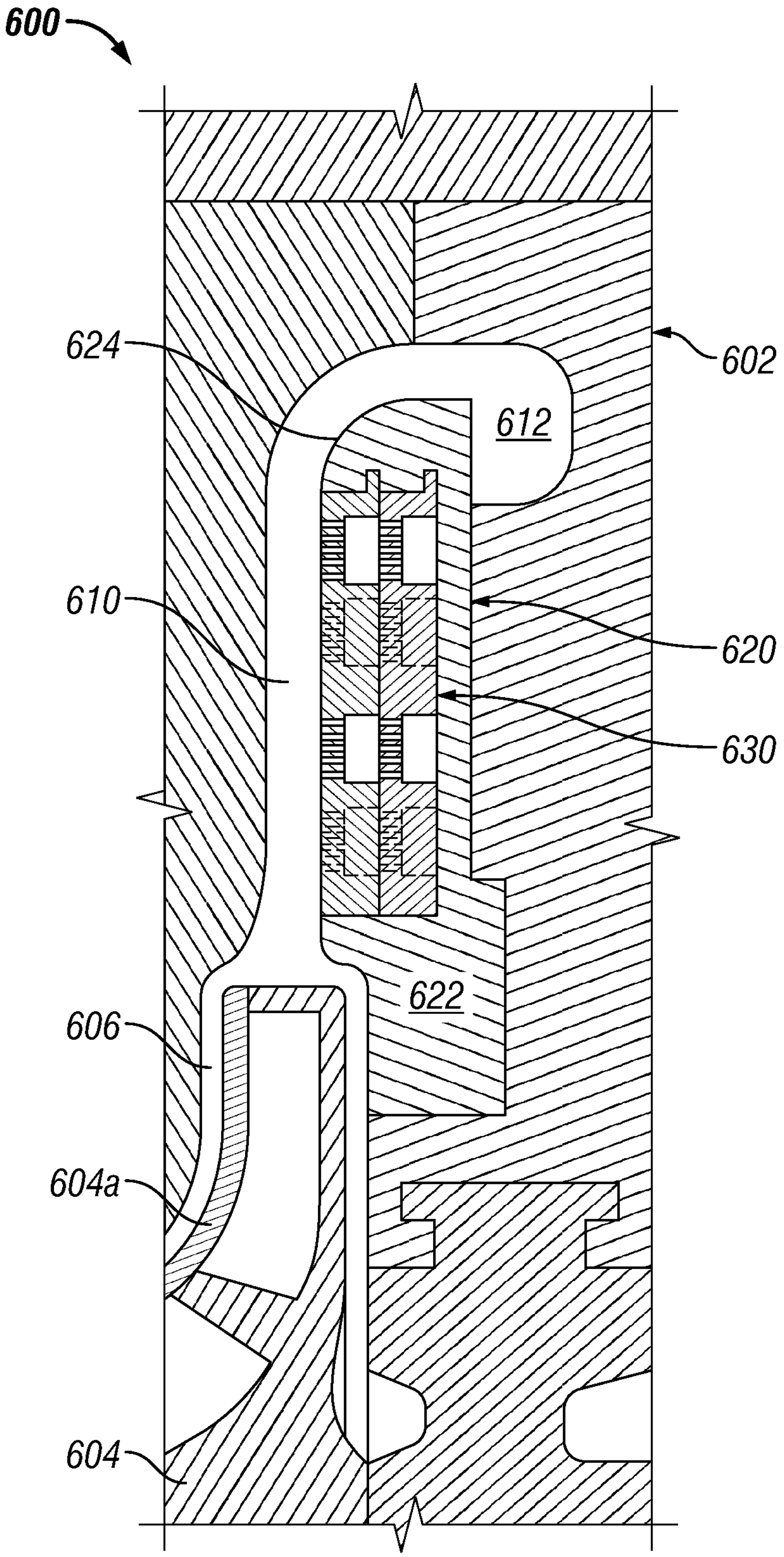
FIGS. 6A and 6B illustrate partial cross-sectional views of a fluid pressurizing device incorporating one or more of the acoustic resonator assemblies illustrated in FIGS. 2A, 2B, 2C, 3, 4A, 4B, 4C, 5A, 5B, and/or 5C, according to one or more embodiments disclosed.

FIG. 6A illustrates a portion of an exemplary rotating machine 600, according to one or more embodiments of the disclosure. In one embodiment, the rotating machine 600 may be a high-pressure fluid pressurizing device, such as a centrifugal compressor, an axial compressor, a back-to-back compressor, or the like. The rotating machine 600 may include a casing 602 defining an impeller cavity 606 for receiving an impeller 604 which is mounted for rotation in the cavity. It is understood that a power-driven shaft rotates the impeller 604 at a high speed, sufficient to impart a velocity pressure to the working fluid in the rotating machine 600.

The impeller 604 may include a plurality of impeller blades 604*a* arranged axi-symmetrically around the shaft for discharging the working fluid into a diffuser passage, or channel 610 formed in the casing 602 radially outwardly from the impeller cavity 606 and the impeller 604. The channel 610 may receive the high pressure working fluid from the impeller 604 before it is passed to a volute, or collector, 612. The diffuser channel 610 may function to convert the velocity pressure of the working fluid into static pressure which may be coupled to a discharge volute, or collector 612 also formed in the casing and connected with the diffuser channel 610. Although not shown in FIG. 6A, it is understood that the discharge volute 612 may couple the compressed working fluid to an outlet of the rotating machine 600. Due to centrifugal action of the impeller blades 604*a*, working fluid may be compressed to a relatively high pressure. The rotating machine 600 may also provide with conventional labyrinth seals, thrust bearings, tilt pad bearings, and other apparatus conventional to rotating machines 600.

A mounting bracket 620 may be secured to a diffuser wall of the casing 602 to define the diffuser channel 610 and may include a base 622 disposed adjacent the outer end portion of the impeller 604 and a plate 624 extending from the base and along the diffuser wall of the casing 602. An acoustic resonator assembly 630 may be mounted in a groove in the plate 624 of the bracket 620 and may extend around the impeller 604 for 360 degrees. The acoustic resonator assembly 630 may be implemented according to embodiments described above and illustrated in FIGS. 2A, 2B, 2C, 3, 4A, 4B, 4C, 5A, 5B, and/or 5C.

Figure 6B:
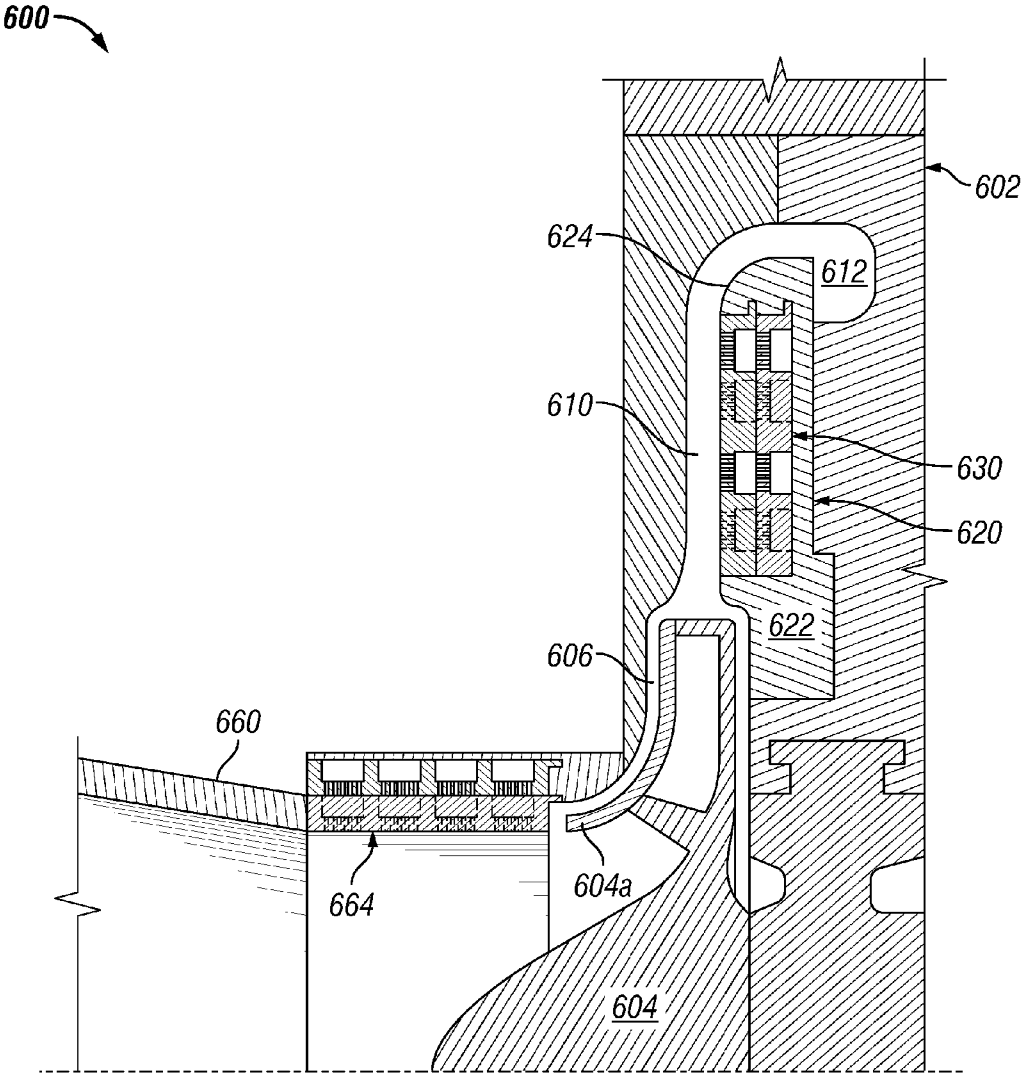

In another embodiment illustrated in FIG. 6B, an acoustic resonator assembly may additionally be disposed at or adjacent an inlet conduit 660 of the rotating machine 600 that introduces working fluid to the inlet of the impeller 604. An acoustic resonator assembly 664 may be mounted on the inner wall of the conduit 660. The acoustic resonator assembly 664 may be implemented according to the embodiment described above and illustrated in FIG. 3.

Figure 7:
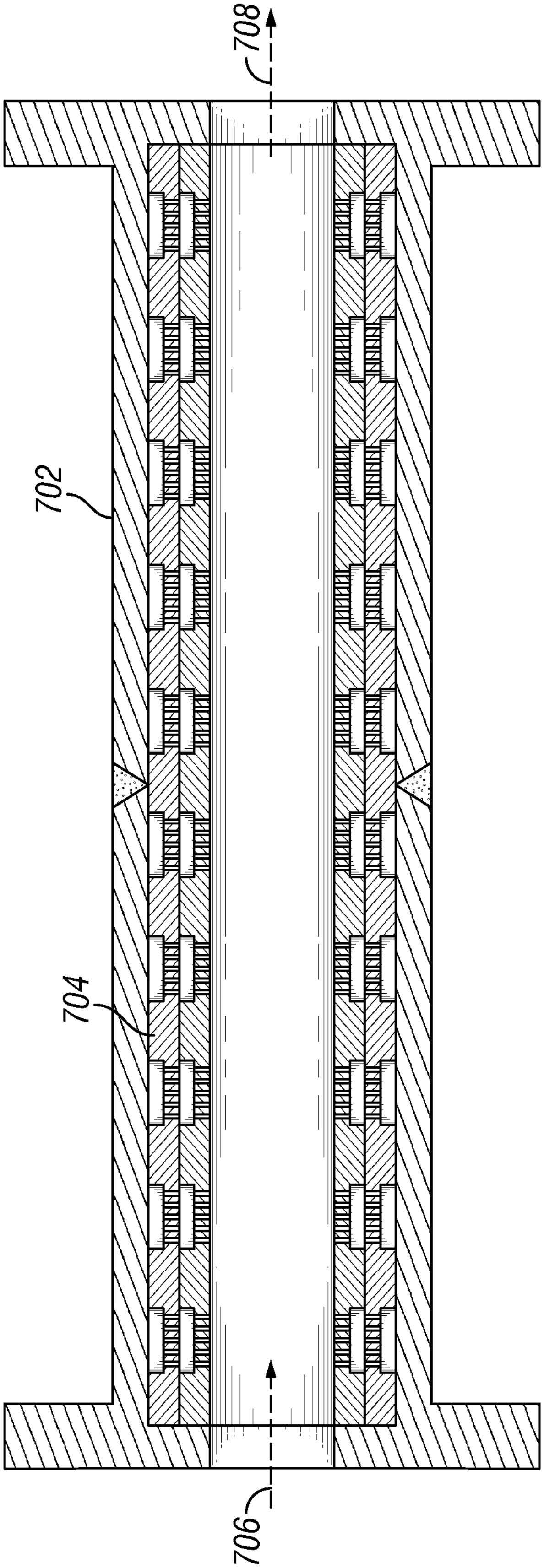
FIG. 7 illustrates a partial cross-sectional view of a fluid-carrying conduit incorporating the acoustic resonator assembly illustrated in FIG. 3, according to one or more embodiments disclosed.

FIG. 7 illustrates a partial cross-sectional view of a fluid-carrying conduit 702, according to one or more embodiments disclosed. The fluid-carrying conduit 702, for example, a pipeline, may be configured to transport pressurized fluid. An acoustic resonator assembly 704 may be mounted on the inner wall of the fluid-carrying conduit 702. The acoustic resonator assembly 704 may be implemented according to the embodiment described above and illustrated in FIG. 3.

In an exemplary operation, the fluid-carrying conduit 702 may be coupled to one or more other conduits, components and/or systems and may be configured to transport a pressurized fluid, such as, steam. The pressurized fluid may enter and exit the fluid-carrying conduit 702 as indicated by the arrows 706, 708. The fluid-carrying conduit 702 and/or one or more components and/or systems upstream and/or downstream of the fluid-carrying conduit 702 may act as noise sources and generate acoustic energy, or noise. The acoustic resonator assembly 704 may attenuate the noise generated by these noise sources.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. An acoustic resonator assembly, comprising:

a first annular acoustic liner defining a first plurality of openings extending between a first annular surface of the first annular acoustic liner and a second annular surface of the first annular acoustic liner opposite the first annular surface of the first annular acoustic liner;

a second annular acoustic liner defining a second plurality of openings extending between a first annular surface of the second annular acoustic liner and a second annular surface of the second annular acoustic liner opposite the first annular surface of the second annular acoustic liner; and an annular disk defining a third plurality of openings extending between a first annular surface of the annular disk and a second annular surface of the annular disk opposite the first annular surface of the annular disk, the annular disk disposed between the first annular acoustic liner and the second annular acoustic liner, and the annular disk configured to rotate relative to the first annular acoustic liner and the second annular acoustic liner to attenuate one or more frequencies of acoustic energy generated by working fluid flowing past the acoustic resonator assembly, the annular disk being configured to rotate such that at least one opening of the first plurality of openings and at least one opening of the second plurality of openings are not overlapping, wherein each opening of the third plurality of openings is formed from a plurality of holes, each hole of the plurality of holes extending between the first annular surface of the annular disk and the second annular surface of the annular disk, and the third plurality of openings being the same size as each of the first plurality of openings and the second plurality of openings.

2. The acoustic resonator assembly of claim 1, wherein the first plurality of openings are formed in a plurality of annularly arranged rows on the first annular surface of the first annular acoustic liner, the second plurality of openings are formed in a plurality of annularly arranged rows on the first annular surface of the second annular acoustic liner, and the third plurality of openings are formed in a plurality of annularly arranged rows on a first annular surface of the annular disk.

3. The acoustic resonator assembly of claim 2, wherein the first plurality of openings are formed from (i) a first plurality of cells at least partially extending from the first annular surface of the first annular acoustic liner toward the second annular surface of the first annular acoustic liner, and (ii) a first plurality of holes extending from the second annular surface of the first annular acoustic liner to at least one of the first plurality of cells, and the second plurality of openings are formed from (i) a second plurality of cells at least partially extending from the first annular surface of the second annular acoustic liner toward the second annular surface of the second annular acoustic liner, and (ii) a second plurality of holes extending from the second annular surface of the second annular acoustic liner to at least one of the second plurality of cells.

4. The acoustic resonator assembly of claim 3, wherein the annular disk being configured to rotate to at least partially misalign the third plurality of openings with at least one of the first plurality of openings and the second plurality of openings decreases a number of frequencies of acoustic energy attenuated by the acoustic resonator assembly.

5. The acoustic resonator assembly of claim 2, wherein the second plurality of openings are formed from (i) a first plurality of cells at least partially extending from the first annular surface of the second annular acoustic liner toward the second annular surface of the second annular acoustic liner, and (ii) a first plurality of holes extending from the second annular surface of the second annular acoustic liner to at least one of the first plurality of cells, each opening of the first plurality of openings extends from the first annular surface of the second annular acoustic liner to the second annular surface of the second annular acoustic liner and has a diameter equal to a diameter of a cell of the first plurality of cells, and each hole of the plurality of holes of the third plurality of openings has a diameter smaller than a diameter of a cell of the first plurality of cells.

6. The acoustic resonator assembly of claim 5, wherein the annular disk is configured to rotate such that the annular disk prevents fluid communication between the first plurality of openings and the second plurality of openings, thereby decreasing a number of frequencies of acoustic energy attenuated by the acoustic resonator assembly.

7. A fluid pressurizing device, comprising:

a casing defining a cavity and having an impeller arranged for rotation within the cavity, the cavity being fluidly coupled to an inlet conduit and a diffuser channel; and a first acoustic resonator assembly coupled to a diffuser wall defined in the diffuser channel and configured to reduce acoustic energy generated in the fluid pressurizing device, the first acoustic resonator assembly including a first annular acoustic liner defining a first plurality of openings extending between a first annular surface of the first acoustic liner and a second annular surface of the first annular acoustic liner opposite the first annular surface of the first annular acoustic liner;

a second annular acoustic liner defining a second plurality of openings extending between a first annular surface of the second annular acoustic liner and a second annular surface of the second annular acoustic liner opposite the first annular surface of the second annular acoustic liner; and an annular disk defining a third plurality of openings extending between a first annular surface of the annular disk and a second annular surface of the annular disk axially opposing the first annular surface of the annular disk, the annular disk disposed between the first annular acoustic liner and the second annular acoustic liner, and the annular disk configured to rotate relative to the first annular acoustic liner and the second annular acoustic liner to attenuate one or more frequencies of acoustic energy generated by working fluid flowing past the acoustic resonator assembly, the annular disk being configured to rotate such that at least one opening of the first plurality of openings and at least one opening of the second plurality of openings are not overlapping, wherein each opening of the third plurality of openings is formed from a plurality of holes, each hole of the plurality of holes extending between the first annular surface of the annular disk and the second annular surface of the annular disk, and the third plurality of openings being the same size as each of the first plurality of openings and the second plurality of openings.

8. An acoustic resonator assembly, comprising:

a first annular acoustic liner defining a first plurality of openings extending between a first annular surface of the first annular acoustic liner and a second annular surface of the first annular acoustic liner opposite the first annular surface of the first annular acoustic liner;

a second annular acoustic liner defining a second plurality of openings extending between a first annular surface of the second annular acoustic liner and a second annular surface of the second annular acoustic liner opposite the first annular surface of the second annular acoustic liner; and an annular disk defining a third plurality of openings extending between a first annular surface of the annular disk and a second annular surface of the annular disk axially opposing the first annular surface of the annular disk, the annular disk disposed between the first annular acoustic liner and the second annular acoustic liner, and the annular disk configured to rotate relative to the first annular acoustic liner and the second annular acoustic liner to attenuate one or more frequencies of acoustic energy generated by working fluid flowing past the acoustic resonator assembly, wherein each opening of the third plurality of openings is formed from a plurality of holes, each hole of the plurality of holes extending between the first annular surface of the annular disk and the second annular surface of the annular disk, and the third plurality of openings being the same size as each of the first plurality of openings and the second plurality of openings, wherein the annular disk is configured to rotate such that the annular disk prevents fluid communication between the first plurality of openings and the second plurality of openings.

* * * * *